Dec. 22, 1964  H. L. KRELL  3,162,461
GOLF PLAYER'S REST
Filed Jan. 18, 1962  3 Sheets-Sheet 1
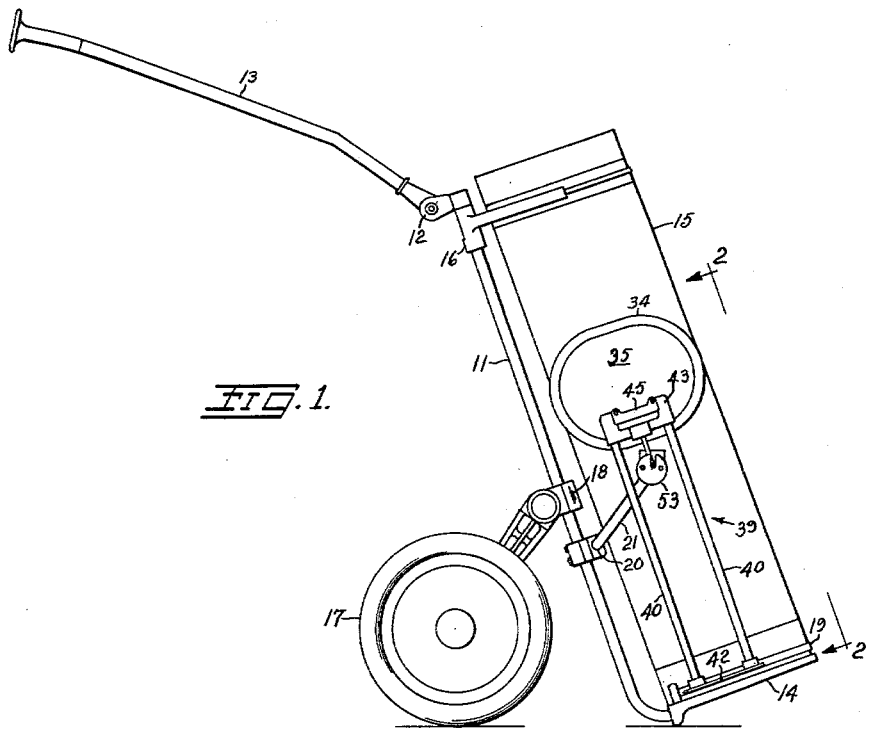
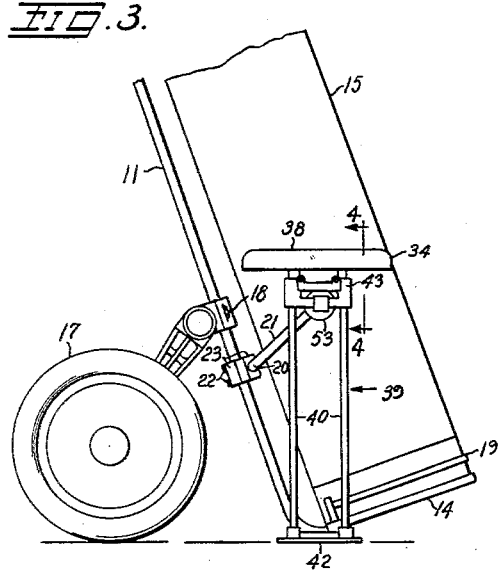
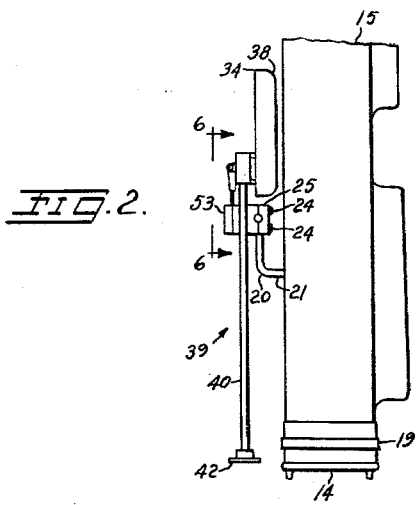
INVENTOR
Herbert L. Krell
BY
AGENT Dec. 22, 1964 H. L. KRELL 3,162,461
GOLF PLAYER'S REST
Filed Jan. 18, 1962 3 Sheets-Sheet 2
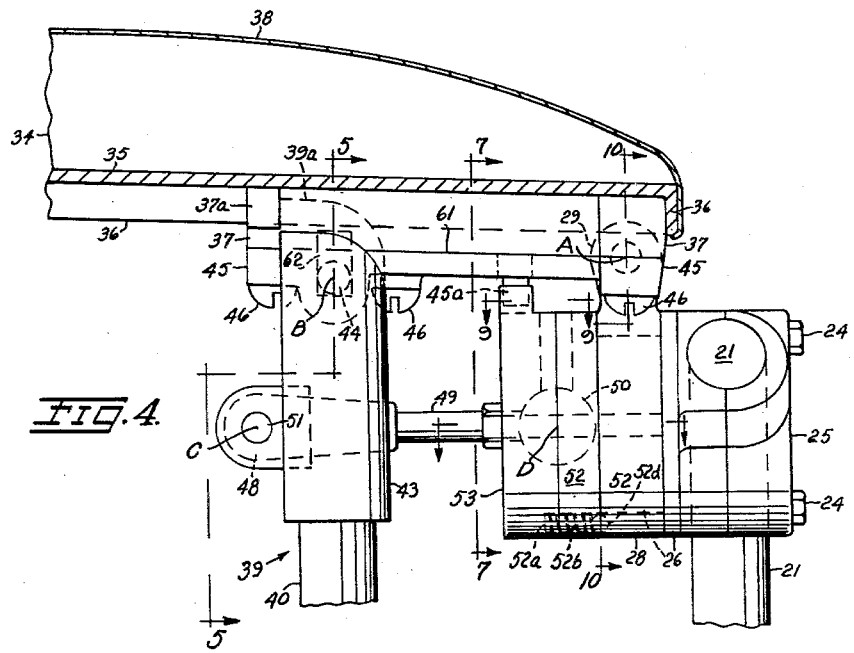
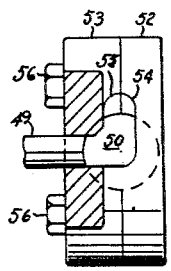
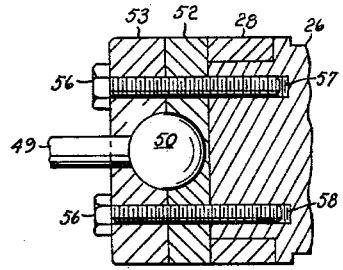
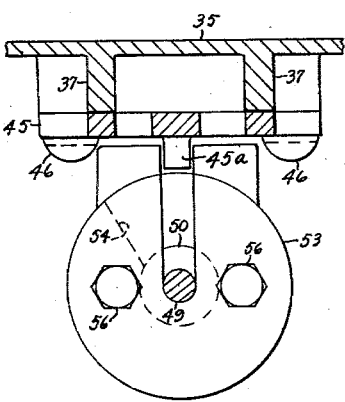
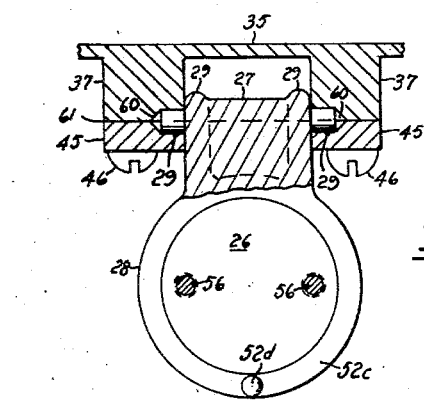
INVENTOR
Herbert L. Krell
BY
AGENT INVENTOR
Herbert L. Krell BY [signature]

AGENT

United States Patent Office 3,162,461
Patented Dec. 22, 1964

3,162,461
GOLF PLAYER'S REST
Herbert L. Kreil, Portland, Oreg., assignor to Jarman-Williamson Company, a partnership
Filed Jan. 18, 1962, Ser. No. 167,073
1 Claim. (Cl. 280—47.19)

This invention relates generally to a foldable two wheeled golf cart for supporting a bag of equipment and accessories as the golf player takes the cart with him on his round of play.

More particularly this invention relates to a foldable rest or seat structure adaptable to being attached to any golf cart already having two laterally spread wheels and a frame with a base forming with the two wheels a triangularly spaced ground contact.

It should be understood that it is common for a golf cart to have a center frame or spine over which an equipment bag is longitudinally balanced along the center line between a pair of laterally spaced parallel wheels. A centerline steering handle extends rearwardly from the upper end of the spine and a bag supporting ground contacting base extends somewhat forwardly from the lower end of the spine to form with the two wheels a stability triangle of contact of the cart with the ground.

It is a primary object of this invention to provide for such a cart a player's rest or seat structure which can easily be attached to the cart for appropriate use therewith and which need not be removed from the cart for temporary storage between days of play.

It is a second object of this invention to provide bracket means for securing on said spine of said cart below the attachment of said wheels thereon of means for rotatably supporting said seat structure on said cart about an axis parallel with the axes of said wheels.

It is a third object of this invention to provide said seat structure with a seat supporting ground post having a free or ground end resting on the ground when the seat of said structure is rotated on the upper end of said post to its horizontal position and said free end of said ground post is raised from the ground when said seat is tilted upwardly on a parallelogram of four linkages of which each of the opposite pair of two linkages are of equal effective length and the adjacent pairs of opposite linkages are similarly movable through similar angles in the plane of the parallelogram at all times.

It is a fourth object of this invention to provide such a cart with such a seat structure including a parallelogram linkage hinging means operable in a plane perpendicular to both said seat and said post to move said post longitudinally upwardly as said seat is tilted upwardly to close the lower corner of said parallelogram.

It is a fifth object of this invention to provide such a cart with such a seat structure including a journal means supported on said cart for supporting said seat structure for rotation about said journal axis parallel to the wheel axis of said cart, said seat structure including a parallelogram linkage hinging means operable in a plane perpendicular to both said seat and said post to support said post on said seat and said seat on said journal means, said parallelogram means including a first hinge means secured to the underside of said seat, a second hinge means spaced a first distance from said first hinge means secured to the underside of said seat and the top end of said post to hinge said post on said seat, a third hinge means spaced a second distance from said second hinge means on said post, a fourth hinge means spaced said first distance from said third hinge means and said second distance from said first hinge means on said joural means.

How these and other objects are attained is explained in the following description referring to the attached drawing in which FIG. 1 is a view in side elevation of the seat structure of this invention when folded to a flat position against the right hand side of the equipment supporting bag carried on a suitable golf cart like the cart fully explained in U.S. Patent No. 2,936,182.

FIG. 2 is an incomplete small scale view in front elevation of the seat and cart as viewed from the line 2—2 of FIG. 1.

FIG. 3 is a fragmental view in side elevation of the seat and cart with the seat structure of FIG. 1 folded down to its position of use by the player at rest.

FIG. 4 is a fragmental view in partial section of the seat structure of this invention as seen from the line 4—4 of FIG. 3.

FIG. 7 is a fragmental view in partial section of the seat structure as viewed from line 7—7 of FIG. 4.

FIG. 8 is a fragmental view in partial section of the seat structure as viewed from line 8—8 of FIG. 4.

FIG. 9 is a fragmental view in partial section of the seat structure as viewed from line 9—9 of FIG. 4.

FIG. 10 is a fragmental view in partial section of the seat structure as viewed from line 10—10 of FIG. 4.

Like numerals of reference refer to like parts in the several figures of the drawing.

Figure 5:
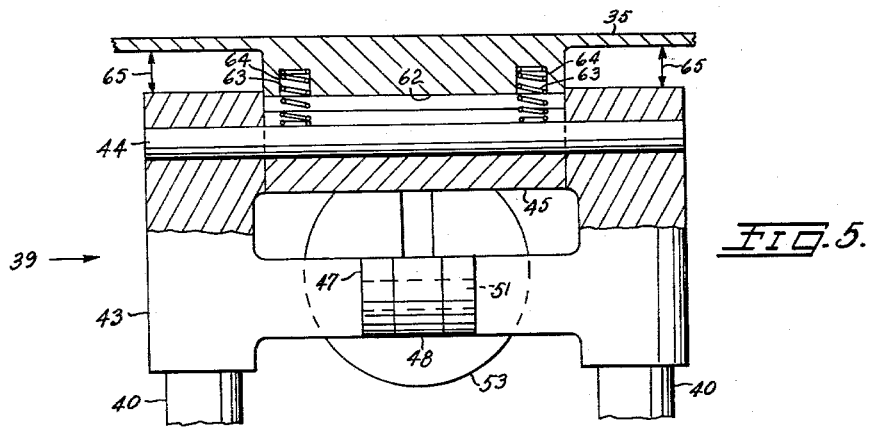
FIG. 5 is a fragmental view in partial section of the seat structure as seen from line 5—5 offset as shown in FIG. 4.

Referring now to the several firures of the drawing there is shown a golf bag cart having a frame or spine 11 by means including clamping screws 18 and bag 15 and adapted to support bag 15 on base 14. Bag 15 is secured at its upper end to spine 11 as shown at 16. Wheels 17, one shown, are positionably secured to spine 11 by means including clamping screws 18 and bag 15 is held on base 14 by strap 19.

Having briefly illustrated and described the golf cart of U.S. Patent No. 2,936,182 as one of the general type to which the player's rest, or seat structure, of this invention is novelly adaptable with great utility, the present invention is shown to comprise, a pipe bracket 21 bent at a right angle as shown at 20 and secured at one end by screws 22 and clamp 23 to the cart frame or spine 11 and at the other end by screws 24 and cap 25 to headed plug or journal means 26 about which hinged collar 28 rotates, as required by hinge pin ears 29 formed on the opposite ends of spool 27 formed as shown on hinged collar 28.

As suggested in FIG. 4 seat 34 is generally oval in plan and comprises a cast metal flat base 35 having a drop circumferential edge 36 within which the base 35 is ribbed for appearance and strength and also to provide heavier sections 37 on which to mount moving parts of the seat structure. The top of the seat is covered with resilient leather appearing cover 38 for both utility and apperance.

As shown in FIGS. 1, 2, 3, 4, 5 and 6 of the drawing, the unitary ground post 39 of the seat structure includes an equal length pair of metal tubes 40 permanently secured together at their lower ends by a metal base bar 42 cast thereabout and at their upper ends by a metal brace bar 43 cast thereabout and thereacross, said brace bar including a steel hinge pin 44 extending perpendicularly between said tubes 40 at the upper ends thereof and secured in position at its ends by the cast metal of said brace bar 43.

The pads 37 depending from the underside of seat base 35 are covered by a matching cap plate 45 secured there-over by screws 46. It should be noted that at their plane of junction both parts are grooved to form a bearing for hinge pin 44 and again to form bearings for hinge pin ears 29 of hinged collar 28–29.

Between the upper ends of tubes 40 of unitary ground post 39, brace bar 43 is seen near its mid length to be formed with a U-section 47 deep enough to receive in the U thereof the eye end 48 of ball arm 49 secured at its other end to hinge ball 50. Rollpin 51 driven through aligned holes in U-section 47 and the matching reamed hole in eye end 48 of ball arm 49 is rigidly held in U-section 47 to form a journal for the matching bearing formed by the eye of ball arm 49.

As seen in FIG. 8, positioned as shown in FIG. 4, hinge ball 50 is held in position between ball socket base 52 and ball socket cap 53 for rotation in any direction but limited by the ability of ball arm 49 to move through slots 54 and 55 a rotational direction of about 10 degrees in one direction about the axis of journal 26 and about 90 degrees in one direction about the axis of rollpin 51.

It is to be noted that long cap screws 56 pass through close clearance holes in parts 53 and 52 and are threaded into mating tapped holes 57 and 58 formed into headed journal means 26 which as above noted is rigidly secured to cart spine 11 and by means of hinge collar 28–29 supports the seat structure on the cart.

Note in FIG. 4 the clearance hole 52a drilled through part 52 and part way into part 53 to receive detent spring 52b and slightly into the rim of collar 28 to receive ball detent 52d to limit the movement of collar 28 with respect to journal means 26.

The basic operation of the present invention of the seat structure with respect to the cart can now be explained as follows. In FIG. 1 the wheeled cart is in open position ready to go with the bag 15 supported on the spine at 16, the spine being supported on the wheels at 18, and the seat structure being supported on the cap 25 at the other end of the working structure shown as 53 in FIG. 1. The present seat structure is thus shown as rigidly supported on the cart with the lower edge of the seat supported on the journal ends 29 of hinge pin structure 27 of collar hinge 28 (see FIG. 10) and with the seat structure tipped up to place the top 38 of the seat 34 back toward the bag. In tipping the seat up in this way the unitary post structure is lifted upwardly parallel with the spine of the cart and the ground post 39 has its base 42 up off the ground and the seat is locked against the bag, all as shown in FIG. 2. In FIG. 1 it is noted that the ball arm 49 is in a slot between parts 52–53 back of ball cap 53 so that the seat can not be folded forwardly and released to the position of use as shown in FIG. 3.

It will be noted that with the seat down in the position shown in FIG. 3 with the cart at rest the base bar 42 of the ground post 39 will sit at the same ground level as does the cart base 14 and nothing needs to be done to the seat when the cart is to be moved, for when the cart is tilted backward to lift the bag for travelling the seat base is lifted with the bag and does not interfere with travelling. But when the player has finished his game and the cart, bag and seat are to be stored, the seat is returned from its position shown in FIG. 3 to its position shown in FIG. 1 by first tilting the seat up until its upholstered top 38 is closely adjacent to bag 15 and then rotating the seat structure to bring the ground post 39 parallel with the cart spine 11 as shown in FIG. 1. This motion again locks the ball arm 49 behind the ball cap 53 and the seat structure is properly combined with the cart and bag for compact storage.

The unfolding of the seat structure from its position in FIG. 1 to its position in FIG. 3 may best be explained starting with FIG. 4 and referring to FIGS. 5 to 10 for the locations of the sections shown in the figures.

Figure 6:
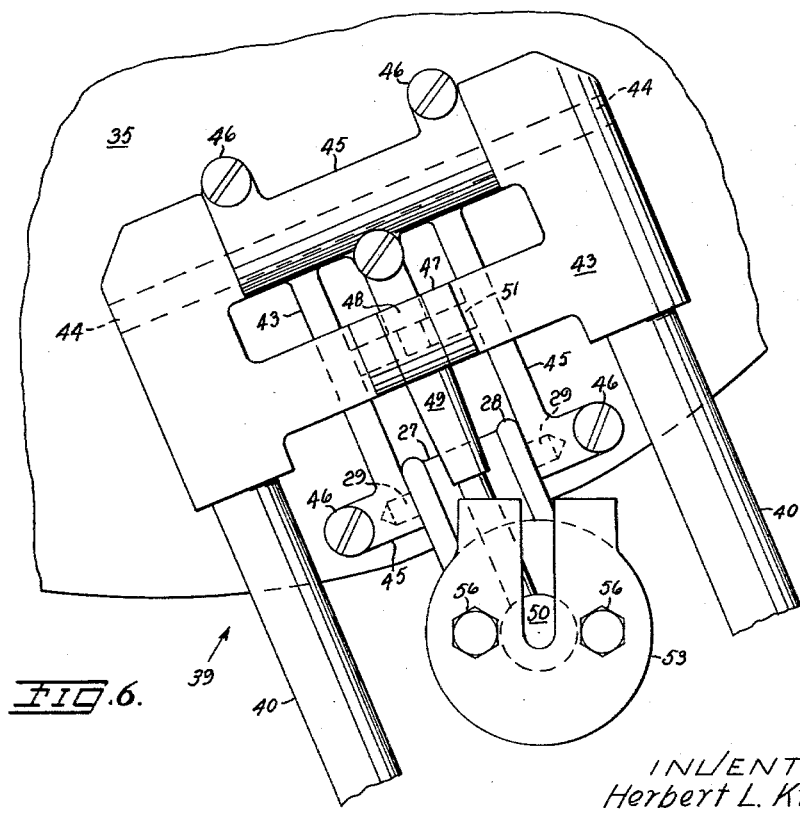
FIG. 6 is a fragmental view of the seat and cart of FIG. 1 enlarged as shown from line 6—6 of FIG. 2.

Again note that pipe bracket 21 is supported on cart spine 11 by screws 22 and clamp 23 and at its other end is clamped to journal means 26 by clamp 25 and screws 24. Then as shown in FIG. 8, ball hinge 50 is clamped by ball socket 52 and ball cap 53 to shouldered journal means 26 by screws 56. In FIGS. 4 and 10 it is seen that the collar part 28 of hinge collar 28–29 is rotatably held in position on journal means 26 between the shoulder of part 26 and ball socket part 52. The hinge pins 29 of hinge collar 28–29 are seen to be journalled in the mating bearing grooves 68 sunk into parts 37, 45 at their mating plane 61. Referring again to FIG. 4 it is seen that seat base 35 with parts 37 cast thereon and cover plate part 45 held by screws 46 to part 37 along plane 61 is hinged at axis 29 to hinge collar 28–29 which in turn is rotatable on journal 26 about the axis of collar 28. With this construction, the seat base 35 can be tilted to a vertical position about hinge pin 29 and in doing so would lift with it the unitary ground post 39 (see also FIGS. 5 and 6) supported by hinge pin 44 cast at its ends into the upper ends of brace bar 43. Pin 44 in turn is carried in long transverse slot 62 through part 37 between the two sides of brace bar 43. Springs 63 set into vertical slots 64 hold the upper end of seat post structure 39 away from the under side of seat top 35 by the distance noted as 65 in FIG. 5 and as indicated as dotted in FIG. 4. Noting in FIGS. 3, 4 and FIG. 5 that when there is no weight on the seat the distance 65 allows the two upper ends of the ground post 39 to clear the shortened pad 37a depending from base 35 and seat base 35 can be tipped upwardly to the right while post 39 is lifted vertically and rotates about pin 44 to clear pad 37a. But if the player sits on seat cover 38 his weight will collapse springs 64 and cause the seat base 35 with pad 37a to settle downward the distance 65 and the new position of the top of post 39 with respect to the seat base 35 or the pad 37a will be as shown dotted in FIG. 4 as 39a. In this condition the seat base pad 37a locks against the post top in the position 39a and the seat can not tip backward when occupied by the players. It can also be noted here that as shown in FIGS. 4 and 7, there is an approximately square detent stud 45a depending from cap plate 45 into the open end of slot 54 in ball cap 53 seat base 35 is horizontal and that when seat base 35 is approximately vertical with ball arm 49 positioned vertically in slots 54–55 the stud 45a will extend from the open side into the U of section 47 of brace bar 43 of ground post 39. With this arrangement it will be noted that the seat can only be rotated about the axis of hinge collar 28 and ball hinge 50 when the seat base 35 is vertical and the ball arm 49 is in the slots 54, 55 between ball socket 52 and ball cap 53 and only then for the angular length of the socket structure 54, 55 as indicated in FIG. 1 and FIG. 6.

It should be noted in FIG. 2 that for temporary storage with the seat base folded upwardly, the seat is moved toward the bag with the seat cover 38 substantially in contact therewith. Also the ground post is moved in substantial parallelism but follows the seat both upwardly and closer to the bag. The novel and useful mechanism for moving the seat structure from its position of availability for use as shown in FIG. 3 to its position of temporary storage can be explained with FIG. 4 as follows.

Bracket 21 is secured rigidly to cart spine 11 as previously noted and journal means 26 has also been shown to be rigidly secured to bracket 21. Seat base 35 is hinged at 29 to collar hinge 28, 29 supported on journal means 26 by collar 28. Ground post, 39, is supported by seat base 35 on hinge pin 44. For convenience calling the hinge centers "29", "44", "51" and "50", A, B, C and D, respectively and the distances between the adjacent hinge centers A–B, B–C, C–D, and D–A, respectively, the distances A–B and C–D will always be substantially the same and the distances B–C and D–A will be substantially the same whenever the hinge angle B–D at A equals the hinge angle B–D at C and the hinge angle A–C at B equals the hinge angle C–A at D. The seat structure is therefore seen to form a motion parallelogram formed primarily by the post 39 hanging gravitationally at the point B to rock on the linkage B–A hinged about the fixed point A. The second linkage C–D merely sets the usual requirement that the opposite sides of a motion parallelogram remain parallel as required in the present case.

The second novel and useful feature of the present structure is the addition thereto of means for supporting the structure rotatable on the axis of said journal means wherein said axis includes the axes of said ball hinge part, said journal means, and said collar hinge part whereby the plane of said parallelogram may be rotated about said axis as limited by the rotational limits of said ball arm between said ball socket part and said ball cap part.

Having thus recited some of the objects of my invention, illustrated and described a preferred form in which my invention may be practiced and explained its operation, I claim:

The combination of a two wheeled golf cart having a golf bag supporting frame in a vertical plane midway between said wheels together with a foldable player's rest and means for attaching said rest to said frame, said means for attaching said rest to said frame including a bracket means secured at one end to said frame and at the other end to journal means for rotatably supporting said rest for rotation about an axis perpendicular to said plane, said rest including a seat part, a ground post part and parts forming a motion parallelogram for connecting said post and said seat with said journal means, said parts forming a motion parallelogram including a collar rotatable on said journal means about the common axis of said journal means and said collar, a collar hinge for hinging said seat to said collar to support said rest on said journal means, a seat hinge for hinging said ground post to said seat about an axis parallel to said collar hinge for supporting said post on said seat to raise said post with said seat and fold both said post and said seat into line with said collar for storage of said rest on said cart, a ground post hinge for additionally supporting said ground post on said journal means for maintaining said ground post in parallelism as said post is raised or lowered by said seat and a ball hinge means rotatable about the axes of both said collar and said collar hinge for combination with said collar and said motion parallelogram parts to rotate said rest about the axis of said journal means to a desired storage position for said rest, wherein said ball hinge is connected to said post hinge by a ball arm and said journal means includes a pair of slots formed therein to receive said ball arm when all said hinges are operated to tip up said seat to raise said post and said rest is rotated about said journal means to secure said rest in its storage position.

References Cited by the Examiner
UNITED STATES PATENTS 2,673,589  3/54  Kunkel _____ 280—47.19
2,777,707  1/57  Cloes _____ 280—36

A. HARRY LEVY, *Primary Examiner.*

PHILIP ARNOLD, *Examiner.*